United States Patent
Gilbert et al.

(10) Patent No.: US 9,402,194 B2
(45) Date of Patent: *Jul. 26, 2016

(54) AUTOMATIC SETTING OF AN ALERT MODE ON A WIRELESS DEVICE

(71) Applicant: AT&T Intellectual Property I, L.P., Atlanta, GA (US)

(72) Inventors: Quenton Gilbert, Sandy Springs, GA (US); James Carlton Bedingfield, Sr., Gainesville, GA (US); Steven Tischer, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/275,340

(22) Filed: May 12, 2014

(65) Prior Publication Data

US 2014/0242968 A1 Aug. 28, 2014

Related U.S. Application Data

(63) Continuation of application No. 13/603,158, filed on Sep. 4, 2012, now Pat. No. 8,725,216, which is a continuation of application No. 11/904,998, filed on Sep. 28, 2007, now Pat. No. 8,260,366.

(51) Int. Cl.

| H04W 24/02 | (2009.01) |
|---|---|
| H04M 1/725 | (2006.01) |
| H04M 19/04 | (2006.01) |
| H04W 4/02 | (2009.01) |

(52) U.S. Cl.
CPC .......... *H04W 24/02* (2013.01); *H04M 1/72566* (2013.01); *H04M 19/04* (2013.01); *H04W 4/023* (2013.01); *H04M 1/72569* (2013.01); *H04M 1/72572* (2013.01)

(58) Field of Classification Search
USPC .............. 455/41.1–41.3, 414.1, 414.2, 414.3, 455/418–421, 422.1, 425, 426.2, 455/456.1–456.6, 458, 550.1, 565, 567
See application file for complete search history.

(56) References Cited

U.S. PATENT DOCUMENTS

| 6,192,050 B1 | 2/2001 | Stovall |
| 6,898,445 B2 | 5/2005 | Slettengren et al. |

(Continued)

OTHER PUBLICATIONS

U.S. Office Action dated Sep. 17, 2010 in U.S. Appl. No. 11/904,998.

(Continued)

*Primary Examiner* — Junpeng Chen
(74) *Attorney, Agent, or Firm* — Hartman & Citrin LLC (57) ABSTRACT

Embodiments are provided for automatically setting an alert mode on a wireless device. Scheduling data is received which defines a predetermined period utilized to set the alert mode. The scheduling data may be received either by direct input in the wireless device or alternatively from an external edge device, such as a network server, in a communications network. In response to receiving the scheduling data, an alert mode on the wireless device is automatically set for the predetermined period. The alert mode may include a silent alert mode on the wireless device. The wireless device may include a sensor for receiving data indicative of a current external state. The sensor data may include location data, temperature data, and ambient noise data. The received sensor data may be utilized to automatically trigger the setting of an alert mode in the wireless device.

12 Claims, 7 Drawing Sheets

(56) References Cited

U.S. PATENT DOCUMENTS

| | | | |
|---|---|---|---|
| 6,968,216 B1 | 11/2005 | Chen et al. | |
| 7,564,804 B2 * | 7/2009 | Lee | H04L 12/2803 370/255 |
| 8,140,127 B2 * | 3/2012 | Luo | 455/567 |
| 2004/0049524 A1 * | 3/2004 | Toyota | B25J 9/1669 |
| 2004/0235461 A1 | 11/2004 | Jackson et al. | |
| 2006/0009265 A1 | 1/2006 | Clapper | |
| 2006/0128419 A1 | 6/2006 | Shimizu et al. | |
| 2009/0245029 A1 * | 10/2009 | Kam | G06K 19/07 368/10 |
| 2009/0270080 A1 * | 10/2009 | Mathew | H04M 1/665 455/414.1 |

OTHER PUBLICATIONS

U.S. Office Action dated May 20, 2011 in U.S. Appl. No. 11/904,998.

U.S. Office Action dated Sep. 2, 2011 in U.S. Appl. No. 11/904,998.

U.S. Notice of Allowance dated Apr. 27, 2012 in U.S. Appl. No. 11/904,998.

U.S. Office Action dated Apr. 1, 2013 in U.S. Appl. No. 13/603,158.

U.S. Notice of Allowance dated Sep. 12, 2013 in U.S. Appl. No. 13/603,158.

U.S. Notice of Allowanced dated Jan. 2, 2014 in U.S. Appl. No. 13/603,158.

* cited by examiner

AUTOMATIC SETTING OF AN ALERT MODE ON A WIRELESS DEVICE

CROSS-REFERENCE TO RELATED APPLICATIONS

This application is a continuation of U.S. patent application Ser. No. 13/603,158, filed Sep. 4, 2012, now U.S. Pat. No. 8,725,216, which is a continuation of U.S. patent application Ser. No. 11/904,998, filed Sep. 28, 2007, now U.S. Pat. No. 8,260,366, each of which is herein incorporated by reference in its entirety.

BACKGROUND

Modern wireless communications devices, such as cellular telephones, allow users to manually enable a "silent mode" setting so that audible ring or other alert tones for incoming calls, text messages or other notifications are silenced so as to not interrupt others in group settings (e.g., meetings, religious services, and the like). However, many users of wireless communications devices either forget to set their devices to silent mode or are unaware of the procedure to do so, resulting in others being interrupted by audible alerts resulting from incoming calls, text messages or other notifications.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Embodiments are provided for automatically setting an alert mode on a wireless device. In one embodiment, scheduling data is received which defines a predetermined period utilized to set the alert mode on the wireless device. The scheduling data may be received either by direct input in the wireless device or alternatively from an external edge device, such as a network server, in a communications network. In response to receiving the scheduling data, an alert mode on the wireless device is automatically set for the predetermined period defined in scheduling data. The alert mode may include a silent alert mode on the wireless device.

In accordance with another embodiment, the wireless device may include a sensor for receiving data indicative of a current external state associated with the wireless device. The sensor data may include location data, temperature data, and ambient noise data. The received sensor data may be utilized to automatically trigger the setting of an alert mode in the wireless device based on the current external state.

These and other features and advantages will be or become apparent to one with skill in the art upon review of the following drawings and detailed description. It is intended that all such features and advantages be included within this description, be within the scope of the present invention, and be protected by the accompanying claims. It is to be understood that both the foregoing general description and the following detailed description are illustrative only and are not restrictive of the invention as claimed.

DETAILED DESCRIPTION

Embodiments are provided for automatically setting an alert mode on a wireless device. In one embodiment, scheduling data is received which defines a predetermined period utilized to set the alert mode on the wireless device. The scheduling data may be received either by direct input in the wireless device or alternatively from an external edge device, such as a network server, in a communications network. In response to receiving the scheduling data, an alert mode on the wireless device is automatically set for the predetermined period defined in scheduling data. The alert mode may include a silent alert mode on the wireless device. In accordance with another embodiment, the wireless device may include a sensor for receiving data indicative of a current external state associated with the wireless device. The sensor data may include location data, temperature data, and ambient noise data. The received sensor data may be utilized to automatically trigger the setting of an alert mode in the wireless device based on the current external state.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Referring now to the drawings, in which like numerals represent like elements through the several figures, various aspects of the present invention and an illustrative network environment will be described. In particular, FIG. 1 and the corresponding discussion are intended to provide a brief, general description of a suitable network in which the invention may be implemented.

Embodiments of the invention may be implemented as a computer process, a computing device, or as an article of manufacture, such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

Figure 1:
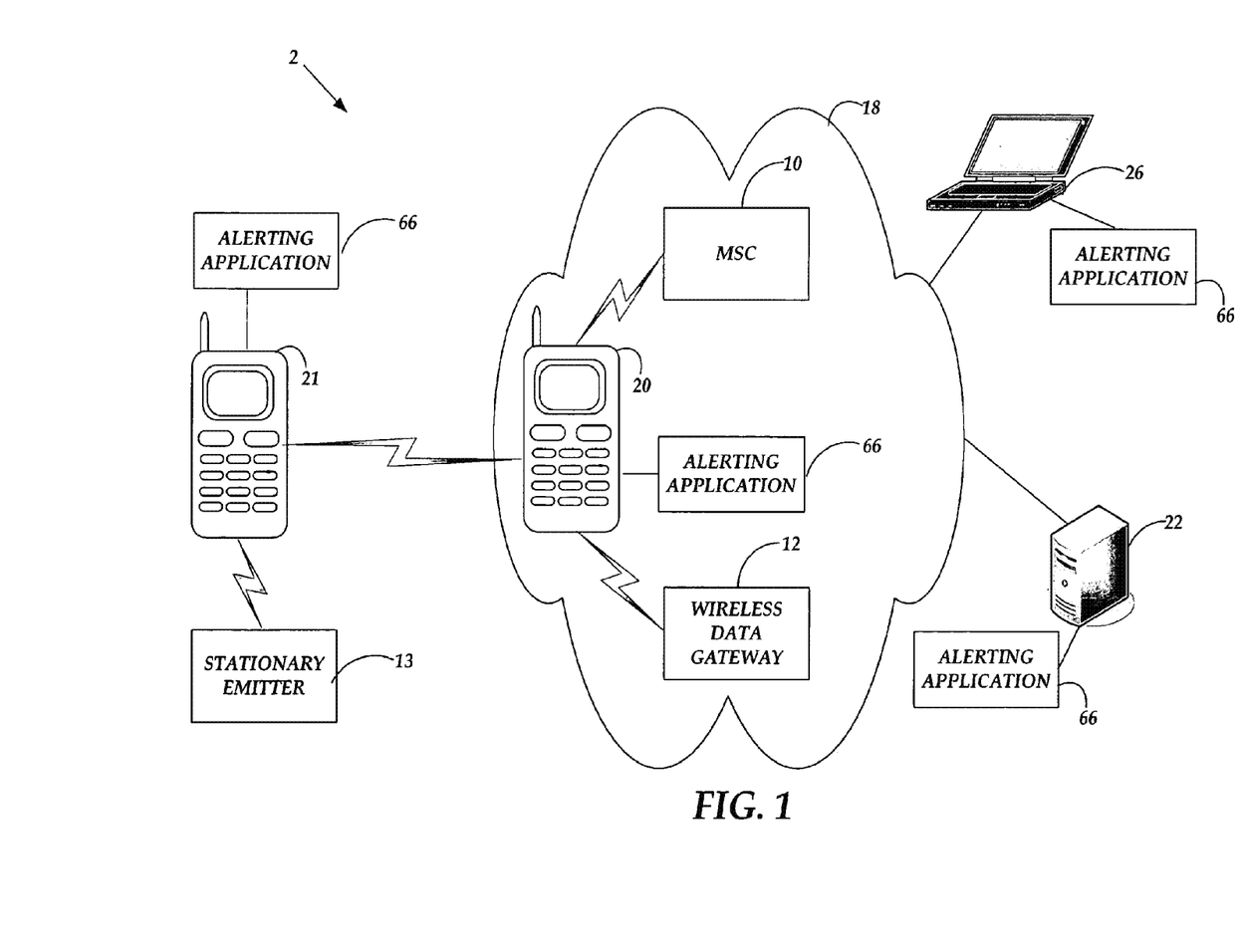
FIG. 1 is a network architecture diagram illustrating aspects of network devices utilized in and provided by various embodiments of the invention.

Referring now to FIG. 1, an illustrative network environment 2 for the several embodiments, utilizing the techniques described herein, will be described. As shown in FIG. 1, the network environment 2 may comprise a centralized communications network 18 which includes a wireless device 20 which may be utilized for voice and data communications. In one embodiment, the wireless device 20 may comprise a wireless telephone such as a "smartphone." As should be understood by those skilled in the art, smartphones combine the functions of a conventional mobile telephone with functionality typically included in a personal or hand-held computer (such as a personal digital assistant ("PDA")) including, but not limited to, an operating system, a processor and a memory for executing and storing various application programs, a graphics capable display, Internet access, e-mail access, short message service ("SMS") communications, scheduling software, audio recording, contact management, Global Positioning System ("GPS") navigation hardware and software, infrared wireless technology, BLUETOOTH wireless technology, and wireless fidelity ("Wi-Fi") technology for communicating data over 802.11 networks. In particular, the wireless device 20 may be operative to execute an alerting application 66 for automatically setting an alert mode. In accordance with one embodiment, the alerting application 66 may be operative to generate a user interface to receive scheduling data which defines a predetermined period utilized to set the alert mode. The scheduling data may be received either by direct input in the wireless device 20 or alternatively from an external "edge" device, such as stationary emitter 13, wireless device 21, server 22, or personal computer 26. In response to receiving the scheduling data, the alerting application 66 may be utilized to automatically set the alert mode for the predetermined period defined in scheduling data. The components and functionality of the wireless device 20 will be discussed in greater detail below with respect to FIG. 2.

The wireless device 20 may be in communication with a mobile switching center ("MSC") 10. The MSC 10 may be utilized to communicate voice calls from the wireless device 20 over the public switched telephone network ("PSTN"). The wireless device 20 may also be in communication with a wireless data gateway 12 for communicating data messages over a wide area computer network, such as the Internet. As is known to those skilled in the art, wireless data gateways enable wireless communication of data over a computer network. Those skilled in the art will further appreciate that the functions of the wireless data gateway 12 may be incorporated into the MSC 10.

As discussed above, the network environment 2 may also include external edge devices such as the stationary emitter 13, the wireless device 21, the server 22, and the personal computer 26. As defined herein and in the appended claims, an "edge device" may include a device which is external to a centralized communication network (such as the network 18) and which may be in intermittent communication with the network 18. As defined herein and in the appended claims, an "edge device" may also include a device which is never in communication with a centralized communication network at all but which is in intermittent communication with other devices which may be in communication with the centralized communication network. For example, in the network environment 2, the wireless device 21 may be in intermittent communication with the wireless device 20 and may be capable of sending scheduling data received from the stationary emitter 13 (also an edge device) for setting an alert mode to the wireless device 20.

In accordance with one embodiment, the stationary emitter 13 may be a device configured to trigger a silent alert mode in the wireless device 21 upon the occurrence of an event in a venue. For example, the stationary emitter 13 may be located in a venue utilized for religious services and may be configured to send venue data (e.g., scheduling data) to the alerting application 66 executing on the wireless device 21 during a scheduled religious service. The alerting application 66 may then cause the wireless device 21 to enter into a silent alert mode which lasts the duration of the religious service. In accordance with another embodiment, the wireless device 21 may further be configured to "discover" other devices in the vicinity (e.g., by communicating a discovery signal within the facility utilizing any number of wireless communications methods) and wirelessly communicate data causing the discovered device or devices to also enter into the silent alert mode.

The server 22 may include interactive voice response ("IVR") functionality for utilizing the alerting application 66 to receive scheduling data for setting an alert mode for the wireless device 20. It should be understood that once the scheduling data is received on the server 22, the scheduling data may then be communicated to the wireless device 20 to set the alert mode. The personal computer 26 may be operative to execute the alerting application 66 which may be utilized to send scheduling data for setting an alert mode on the wireless device 20. It should be understood by those skilled in the art that the server 22 and the personal computer 26 may communicate with the network 18 utilizing a variety of low speed and high speed connections, including, but not limited to, Integrated Services Digital Network ("ISDN"), Digital Subscriber Line ("DSL"), and T1 lines. In accordance with various embodiments, the personal computer 26 may also communicate with the network 18 via wireless and wireline connections to a wireless network (such as a cellular network) or a cable services network via a cable modem. These and other connections for communicating with computer networks are well known to those skilled in the art.

Figure 2:
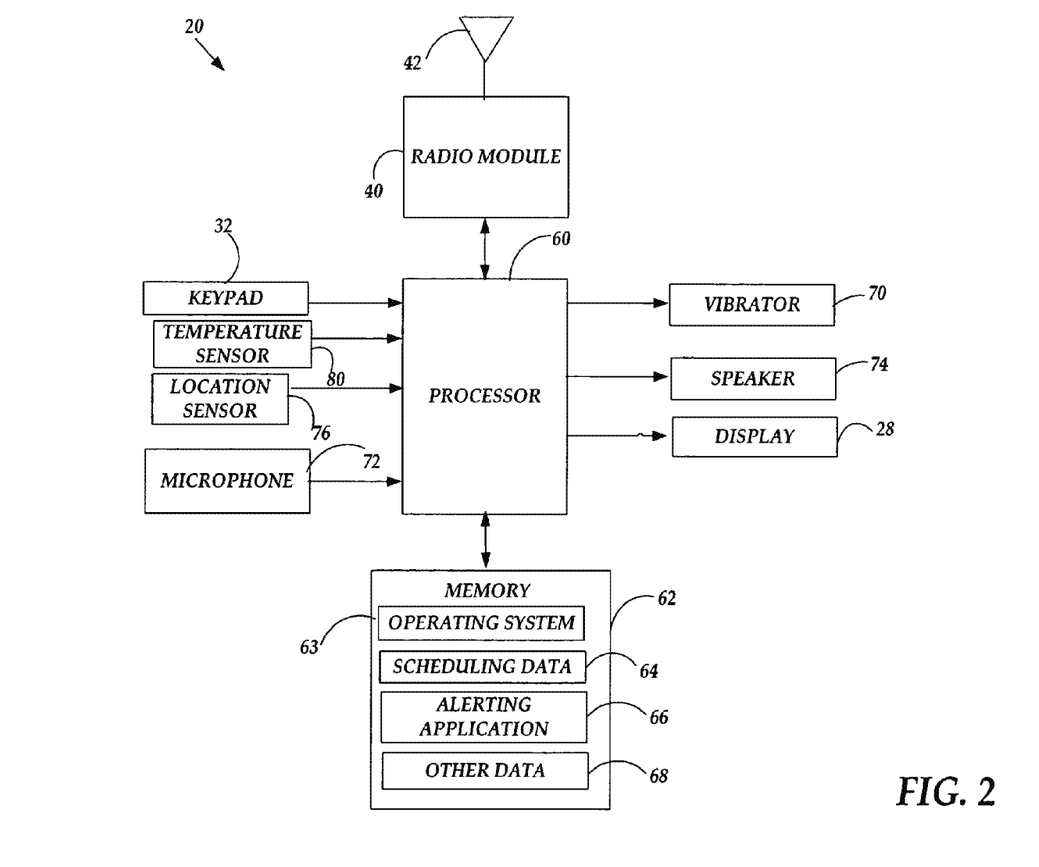
FIG. 2 is a block diagram of a wireless communications device utilized in the network architecture of FIG. 1, in accordance with various embodiments of the invention.

Referring now to FIG. 2, the wireless device 20 will now be described in greater detail. As shown in FIG. 2, the wireless device 20 includes a processor 60 and a memory 62. In the wireless device 20, the processor 60 is connected to a display 28, a keypad 32, a radio module 40, a vibrator 70, a microphone 72, a speaker 74, a location sensor 76 (which may include, but is not limited to, a GPS receiver) for determining a location, and a temperature sensor 80 for measuring ambient temperature. It should be appreciated by those skilled in the art that the vibrator 70 may have functionality for generating silent mode alerts on the wireless device 20. The radio module 40 may be operative to send and receive voice and data via a connected antenna 42. In accordance with various embodiments, the wireless communications module may include, but is not limited to, a BLUETOOTH wireless technology communications module, a Wi-Fi communications module for communicating data over 802.11 networks including IEEE 802.16 ("WiMAX"), and an infrared communications module.

The memory 62 stores an operating system 63, scheduling data 64, which may be utilized in scheduling alert mode periods, the alerting application 66, and other data 68 such as ring tones for audible mode alerts on the wireless device 20. It will be appreciated that in one embodiment, the memory 62 may comprise a computer-readable storage media including volatile and non-volatile, removable and non-removable media implemented in any method or technology for storage of information such as computer-readable instructions, data structures, program modules or other data. By way of example, and not limitation, computer-readable storage media may include, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by a computer. It should be appreciated that the wireless device 21 may include many of the same components illustrated in FIG. 2 and described above.

As discussed above with respect to FIG. 1, the alerting application 66 may be operative to generate a user interface which may be utilized to automatically set an alert mode on the wireless device 20 using the scheduling data 64 which defines a predetermined period for the duration of the alert mode. It should be understood that in accordance with various embodiments, the alert modes set on the wireless device 20 may include either a silent alert mode (which may include a vibrating alert) or an audible alert mode (which may include a ring tone alert). It should be understood that the type of the alert mode may be manually selected by a user of the alerting application 66 or automatically selected by the alerting application 66 based on sensor data measured by the sensors 76 and 80 as well as the microphone 72. Logical operations illustrating the operation of the alerting application 66 in automatically setting alert modes will be described in greater detail below with respect to FIGS. 3-5.

Figure 3:
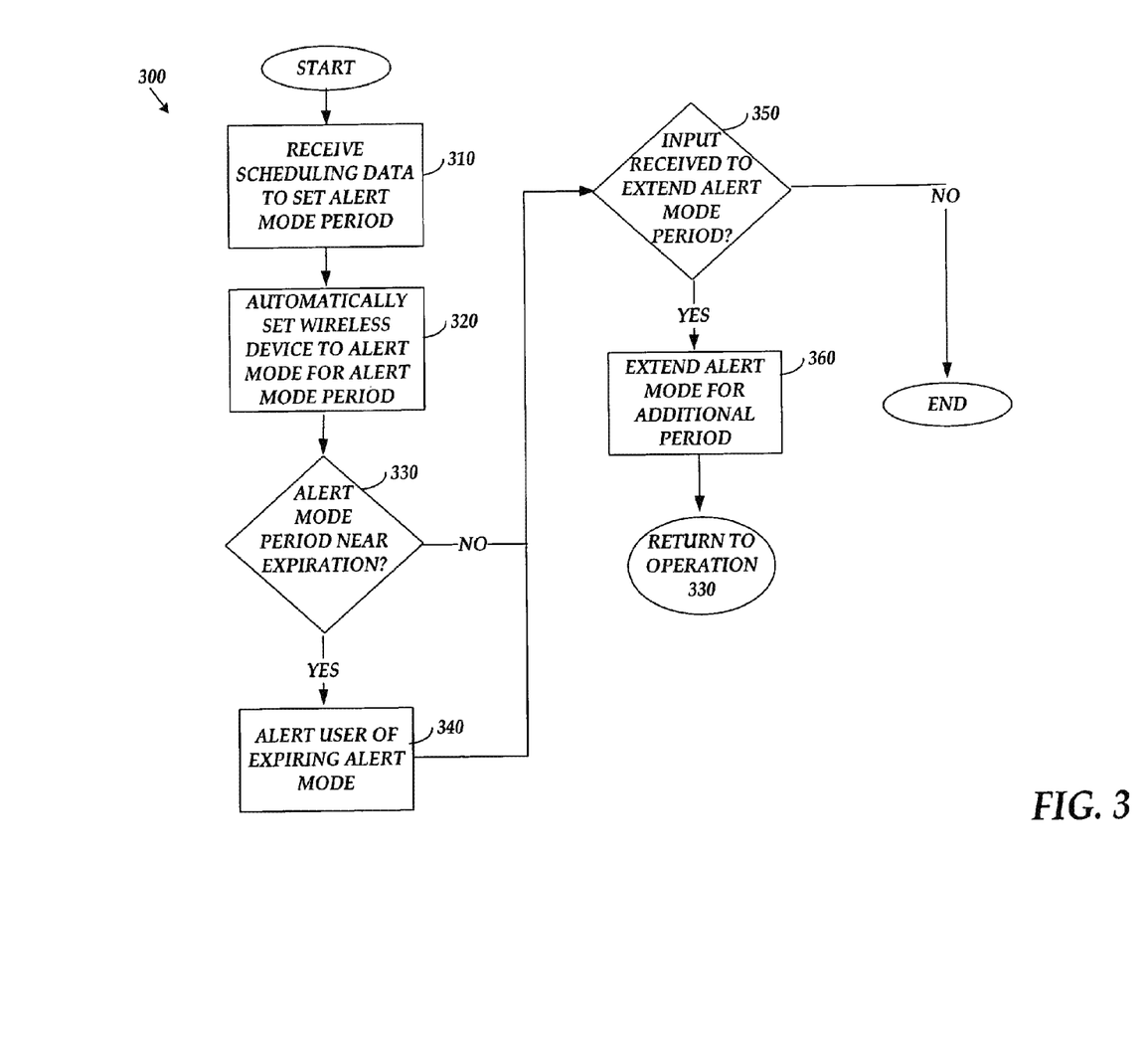
FIG. 3 is a flow diagram illustrating aspects of a process for automatically setting an alert mode on a wireless device, in accordance with an embodiment of the invention.

Referring now to FIG. 3, an illustrative routine 300 will be described illustrating a process performed by the alerting application 66 in the network environment 2 for automatically setting an alert mode on the wireless device 20. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIG. 3-5 and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

The routine 300 begins at operation 310, where the alerting application 66 receives the scheduling data 64 to set an alert mode period for an alert mode which may be selected on the wireless device 20. For example, in accordance with an embodiment, a user of the wireless device 20 having a weekly meeting on Mondays between 2 PM and 3 PM may enter, via a user interface generated by the alerting application 66, the aforementioned scheduling data 64 to enter the desired day, period, and alert mode type so as to schedule the wireless device 20 to automatically enter into a silent alert mode every Monday during the predetermined period (i.e., the alert mode period).

It will be appreciated that the scheduling data 64 for scheduling an alert mode may be received by the wireless device 20 utilizing a number of methods. In particular, in accordance with various embodiments, the scheduling data 64 may be received via direct input into the alerting application 66 executing on the wireless device 20 (e.g., via the keypad 32) or via a signal communicated by an edge device, such as the server 22, executing the alerting application 66. It will be appreciated by those skilled in the art that the scheduling data 64 may be remotely entered in an edge device by a user via voice or data entry. For example, in accordance with an embodiment, the alerting application 66 may be a networked application enabling a user to remotely enter the scheduling data 64 on the server 22 via a web page on the personal computer 26, which is in communication with the server 22. In accordance with another embodiment, a user may use either voice or keypad entry on the wireless device 20 to remotely enter the scheduling data 64 into the alerting application 66 executing on the server 22. For example, if the server 22 comprises IVR functionality, a user may utilize voice or keypad input (such as a feature code) on the wireless device 20, the wireless device 21, or another communications device, to enter the scheduling data 64. The alerting application 66, upon receiving the scheduling data 64 on the server 22, may be configured to then send the scheduling data 64 to the wireless device 20 and further remotely and automatically set the wireless device to an alert mode identified in the scheduling data 64 during the alert mode period selected by a user. Those skilled in the art will appreciate that remotely sending the scheduling data 64 and setting the alert mode on the wireless device 20 may be facilitated by over-the-air provisioning ("OTAP"). Generally, OTAP uses wireless mechanisms to send software and provisioning data to mobile devices automatically. It will be appreciated that when utilizing the server 22 (or any other edge device) to enter the scheduling data 64, it is not necessary for the alerting application 66 to be installed on the wireless device 20.

From operation 310, the routine 300 continues to operation 320, where the alerting application 66 automatically sets the wireless device 20 to the alert mode identified in the scheduling data 64 for the alert mode period. In particular, upon receiving the scheduling data 64, the alerting application 66 may be configured to automatically access an existing alert mode menu on the wireless device 20, and if necessary, set the desired alert mode (e.g., silent mode). Once the alert mode has been set, the wireless device 20 may emit an alert corresponding to the specified alert mode (e.g., a vibrating alert if a silent mode is specified) when receiving incoming calls during the alert mode period. The alerting application 66 may also be configured to keep track of the alert mode period as it elapses and once the alert mode period has elapsed, reset the alert mode to the previous setting (if necessary). As discussed above with respect to operation 310, the alert mode may be automatically set remotely by the alerting application 66 executing on the server 22 via OTAP.

From operation 320, the routine 300 continues to operation 330, where the alerting application 66 determines, during the alert mode period, whether the alert mode period is nearing expiration. If, at operation 330, the alerting application 66 determines that the alert mode period is nearing expiration, the routine 300 continues to operation 340 where the alerting application 66 may then automatically alert a user of the wireless device 20 of the expiring alert mode. For example, the alerting application 66 may be configured to cause the wireless device 20 to generate an increasing sequence of vibrating alerts to notify the user that the alert mode period is coming to an end. From operation 340, the routine 300 continues to operation 350.

If, at operation 330, the alerting application 66 determines that the alert mode period is not nearing expiration, the routine 300 branches to operation 350 where the alerting application 66 determines, during the alert mode period, whether an input has been received on the wireless device 20 to extend the alert mode period. In particular, the alerting application 66 on the wireless device 20 may be configured to program a "hot key" on the keypad 32 for extending the alert mode period a further predetermined period.

If, at operation 350, the alerting application 66 determines that an input for extending the alert mode period has been received on the wireless device 20, the routine 300 continues to operation 360 where the alerting application 66 may then automatically extend the alert mode for an additional predetermined period. For example, if a meeting for which a user has previously scheduled a silent alert mode is running behind schedule, the user may extend the alert mode by pressing the programmed hot key on the wireless device 20 to automatically extend the silent alert mode period an additional thirty minutes, hour, etc. From operation 360, the routine 300 then returns to operation 330 where the alerting application 66 determines, during the extended alert mode period, whether the extended alert mode period is nearing expiration.

If, at operation 350, the alerting application 66 determines that an input for extending the alert mode period has not been received on the wireless device 20, then the previously scheduled alert mode period continues to run until it has elapsed. From operation 350, the routine 300 then ends.

Figure 4:
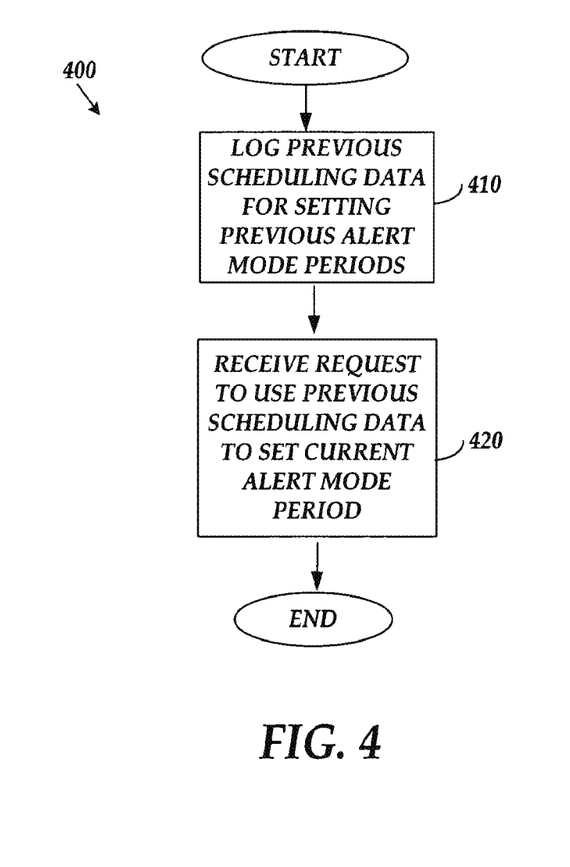
FIG. 4 is a flow diagram illustrating aspects of a process for receiving scheduling data utilized in setting an alert mode on a wireless device, in accordance with various embodiments of the invention.

Turning now to FIG. 4, an illustrative routine 400 will be described illustrating a process performed by the alerting application 66 in the network environment 2 for receiving the scheduling data 64 utilized in setting an alert mode on the wireless device 20, in accordance with various embodiments. The routine 400 begins at operation 410 where the alerting application 66 logs previously entered scheduling data 64 utilized for setting previous alert mode periods on the wireless device 20. In particular, the alerting application 66 may be configured to store the scheduling data 64 received for scheduling individual alert modes on the wireless device 20 and present the previous scheduling data 64 to a user (i.e., in a user interface) for selection as the current scheduling data prior to receiving new scheduling data.

From operation 410, the routine 400 continues to operation 420, where the alerting application 66 receives a request to use previous scheduling data 64 to set a current alert mode period. For example, the alerting application 66 may be configured to generate a user interface from which a user may select previously entered scheduling data 64 having an alert mode period which the user wishes to reuse to set a current alert mode period. It should be appreciated that in this manner, the scheduling of alert mode periods is facilitated by enabling users to select and reuse previously entered scheduling data without having to reenter the scheduling data 64 in the alerting application 66. From operation 420, the routine 400 then ends.

Figure 5:
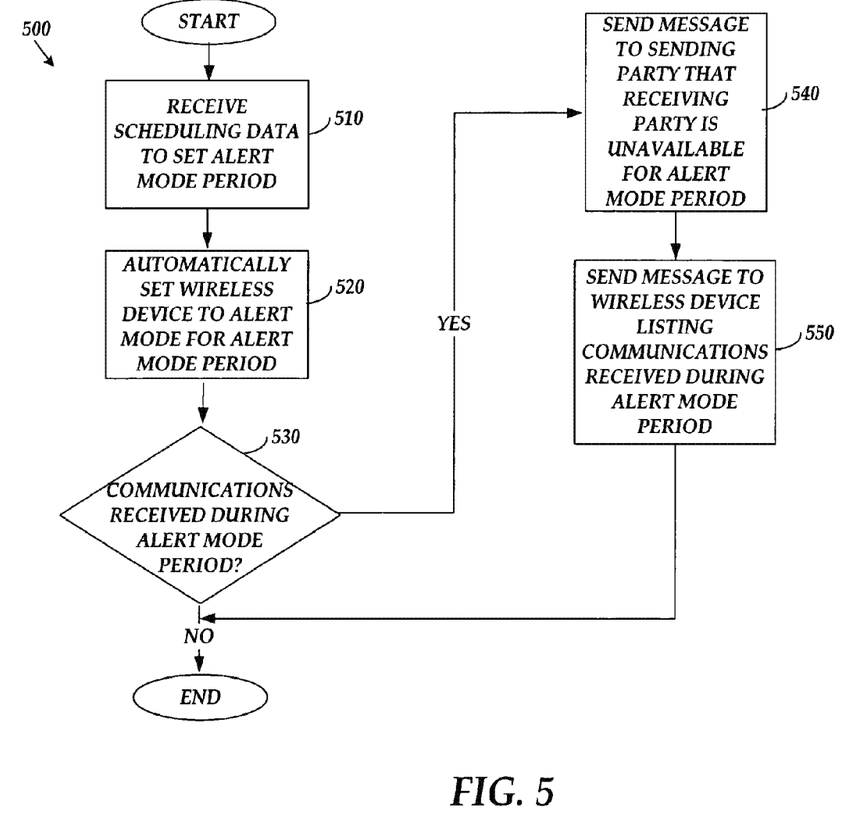
FIG. 5 is a flow diagram illustrating aspects of a process for automatically setting an alert mode on a wireless device from a network edge device, in accordance with an alternative embodiment of the invention.

Turning now to FIG. 5, an illustrative routine 500 will be described illustrating a process performed by the alerting application 66 in the network environment 2 for automatically setting an alert mode on the wireless device 20 from a network edge device, in accordance with an alternative embodiment. The routine 500 begins at operation 510, where the alerting application 66 receives the scheduling data 64 to set an alert mode period for an alert mode which may be selected on the wireless device 20. It should be understood that in this embodiment, alerting application 66 may be executing on a network edge device, such as the wireless device 21 (either independently or via the stationary emitter 13), the server 22, or the personal computer 26 in the network environment 2. Furthermore, the scheduling data 64 may be received in the network edge device and not in the wireless device 20. Still further, the alert mode may comprise a silent alert mode.

From operation 510, the routine 500 continues to operation 520, where the alerting application 66 automatically sets the wireless device 20 to the alert mode identified in the scheduling data 64 for the alert mode period. It will be appreciated that the alert mode may be remotely set from the server 22 using OTAP as described in greater detail above with respect to operation 310 of FIG. 3.

From operation 520, the routine 500 continues to operation 530, where the alerting application 66 determines whether the wireless device 20 receives any communications (e.g., telephone calls, SMS messages, etc.) during the scheduled alert mode period. In particular, the alerting application 66 may be configured to respond to a network trigger placed on a telephone number associated with the wireless device 20. Thus, whenever communications to the wireless device 20 are received in the network environment 2, the alerting application 66 may be configured to check the scheduling data 64 to determine if the communications are being received during the alert mode period.

If, at operation 530, the alerting application 66 determines that the communications being received are not being received during the alert mode period, then the routine 500 then ends. If, at operation 530, the alerting application 66 determines that the communications being received are being received during the alert mode period, then the routine 500 continues to operation 540 where the alerting application 66 may send a message to the party or parties sending the communications that the receiving party associated with the wireless device 20 is unavailable for the duration of the time remaining in the alert mode period. In particular, if the communications include a telephone call and a network voicemail box is associated with the wireless device 20 telephone number then the alerting application 66 may be configured to send the call to the network voicemail box for later retrieval. If there is not a voicemail box associated with the wireless device 20 telephone number, then the alerting application 66 may be configured to cause the server 22 to play an announcement to the sending party or parties that the wireless device 20 associated with the receiving party is currently in a silent alert mode and that the receiving party will be notified of the communications when the alert period has expired. If the incoming communications include SMS or text messages, the alerting application 66 may be configured to send a return text message to the sending party or parties that the wireless device 20 associated with the receiving party is currently in a silent alert mode and that the receiving party will be notified of the text messages when the alert period has expired. The alerting application 66 may also be configured to instruct the server 22 to queue or buffer all received text messages until the alert period has expired.

From operation 540, the routine 500 continues to operation 550, where the alerting application 66 may be configured to send a message to the wireless device 20 listing the communications received during the alert mode period. In particular, the alerting application 66 may be configured to send a text message to the wireless device 20 listing any communications (i.e., voice calls or text messages) directed to the wireless device 20 user's telephone number received in the network environment 2 during the alert mode period. It should be understood that the alerting application 66 may also be configured to allow wireless device users to determine whether or not to allow telephone calls, text messages, and/or other notifications during the alert mode period. From operation 550, the routine 500 then ends.

Figure 6:
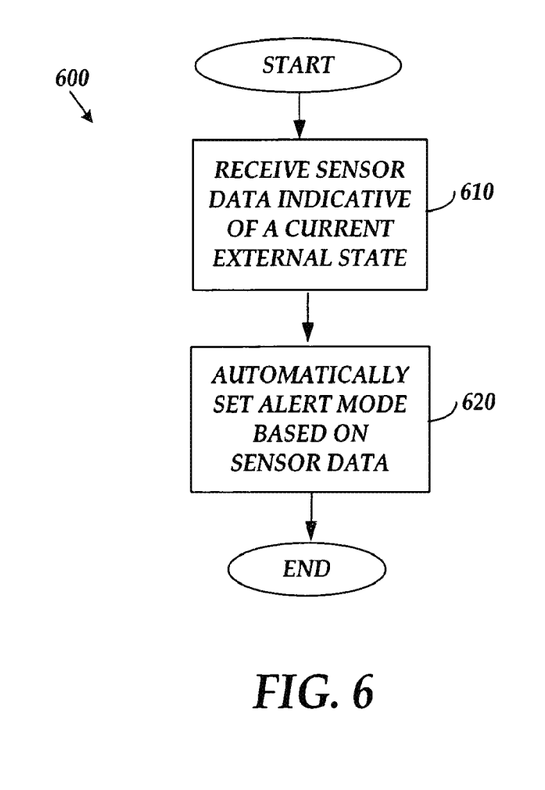
FIG. 6 is a flow diagram illustrating aspects of a process for automatically setting an alert mode utilizing sensor data, in accordance with various embodiments of the invention.

Turning now to FIG. 6, an illustrative routine 600 will be described illustrating a process performed by the alerting application 66 in the network environment 2 for automatically setting an alert mode utilizing sensor data received on the wireless device 20, in accordance with various embodiments. The routine 600 begins at operation 610 where the alerting application 66 receives sensor data indicative of a current external state associated with the wireless device 20. In particular, the alerting application 66 may be configured to receive location and event data determined by the location sensor 76, ambient noise data measured by the microphone 72, and ambient temperature data measured by the temperature sensor 80.

From operation 610, the routine 600 continues to operation 620, where the alerting application 66 automatically sets an alert mode based on and in response to the received sensor data. For example, if the alerting application 66 determines that the location data from the location sensor 76 indicates that the wireless device 20 is currently located in a movie theater, the alerting application 66 may be configured to automatically cause the wireless device 20 to enter into a silent alert mode so that audible alerts are not generated for incoming communications during a movie. As another example, if the alerting application 66 determines from the noise data measured by the microphone 72 that the ambient noise around the wireless device 20 is louder than a predetermined threshold noise level, the alerting application 66 may be configured to automatically set an audible alert mode which generates a high volume audible alert for incoming communications to the wireless device 20, so that the communications may be heard above the current ambient noise level. As another example, if the alerting application 66 determines from the temperature data measured by the temperature sensor 80 that the temperature of the wireless device 20 is within a few degrees of a standard body temperature (i.e., 98.6 degrees), then the alerting application 66 may be configured to determine that the wireless device 20 is being held by or near the body of a user and automatically set a silent alert mode (e.g., vibrating) on the wireless device 20 for incoming communications. From operation 620, the routine 600 then ends.

Figure 7:
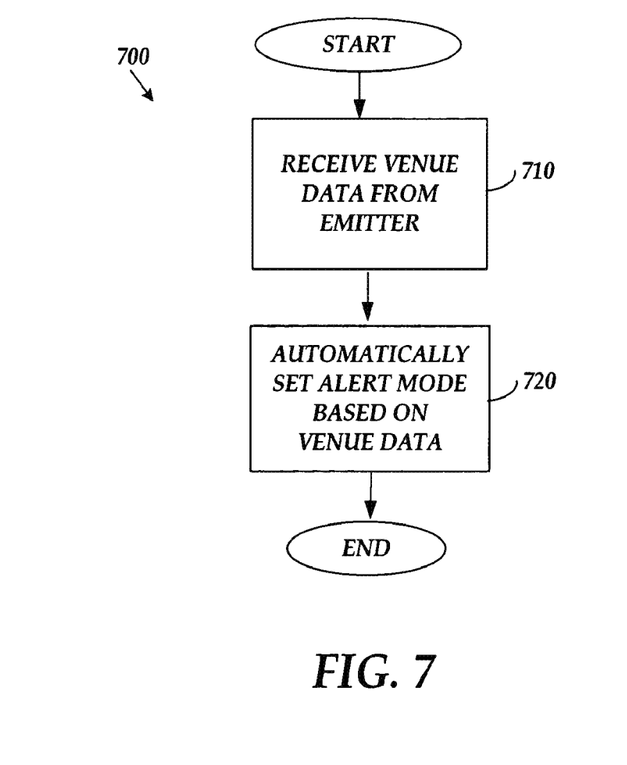
FIG. 7 is a flow diagram illustrating aspects of a process for automatically setting an alert mode utilizing venue-based data, in accordance with various embodiments of the invention.

Turning now to FIG. 7, an illustrative routine 700 will be described illustrating a process performed by the alerting application 66 in the network environment 2 for automatically setting an alert mode on the wireless devices 20 and 21 utilizing venue-based data (which may include data generated by the stationary emitter 13 described above with respect to FIG. 1), in accordance with various embodiments. The routine 700 begins at operation 710 where the alerting application 66 executing on the wireless device 20 may receive venue data from the stationary emitter 13 upon an occurrence of an event at a venue. For example, the stationary emitter 13 may be located in a venue utilized for religious services and be configured to send data which includes a period during which religious services are held in the venue.

From operation 710, the routine 700 continues to operation 720, where the alerting application 66 automatically sets an alert mode based on the received venue data. For example, the alerting application 66 may cause the wireless device 21 to enter into a silent alert mode which lasts the duration of a scheduled religious service. In accordance with another embodiment, the wireless device 21 may further be configured to "discover" other devices in the vicinity (e.g., by communicating a discovery signal within the facility utilizing any number of wireless communications methods) and wirelessly communicate data causing the discovered device or devices to also enter into the silent alert mode. The routine 700 then ends.

It will be apparent by those skilled in the art that various modifications or variations may be made in the present invention without departing from the scope or spirit of the invention. Other embodiments of the present invention will be apparent to those skilled in the art from consideration of the specification and practice of the invention disclosed herein.

What is claimed is:

1. A wireless device comprising:
   a processor; and
   a memory storing instructions that, when executed by the processor, cause the processor to perform operations comprising:
      determining a location of the wireless device,
      causing the wireless device to enter into an alert mode based on the location of the wireless device,
      discovering a device in a vicinity of the wireless device, and
      transmitting, to the device, data for use by the device to cause the device to enter into the alert mode.

2. The wireless device of claim 1, wherein discovering the device in the vicinity of the wireless device comprises transmitting a discovery signal.

3. The wireless device of claim 1, further comprising a sensor for measuring ambient noise, wherein the operations further comprise causing, based on the ambient noise, the wireless device to generate a high volume audible alert for incoming communications to the wireless device.

4. The wireless device of claim 1, further comprising a temperature sensor for measuring ambient temperature, wherein the operations further comprise causing, based on the ambient temperature, the wireless device to enter the alert mode.

5. A non-transitory computer-readable storage device storing instructions that, when executed by a processor of a wireless device, cause the processor to perform operations comprising:
   determining a location of the wireless device;
   causing the wireless device to enter into an alert mode based on the location of the wireless device;
   discovering a device in a vicinity of the wireless device; and
   transmitting, to the device, data for use by the device to cause the device to enter into the alert mode.

6. The non-transitory computer-readable storage device of claim 5, wherein discovering the device in the vicinity of the wireless device comprises transmitting a discovery signal.

7. The non-transitory computer-readable storage device of claim 5, wherein the wireless device further comprises a sensor for measuring ambient noise and wherein the operations further comprise causing, based on the ambient noise, the wireless device to generate a high volume audible alert for incoming communications to the wireless device.

8. The non-transitory computer-readable storage device of claim 5, wherein the wireless device further comprises a temperature sensor for measuring ambient temperature and wherein the operations further comprise causing, based on the ambient temperature, the wireless device to enter the alert mode.

9. A method comprising:
    determining, by a wireless device comprising a processor, a location of the wireless device;
    causing, by the processor of the wireless device, the wireless device to enter into an alert mode based on the location of the wireless device;
    discovering, by the processor of the wireless device, a device in a vicinity of the wireless device; and
    transmitting, by the wireless device, to the device in the vicinity of the wireless device, data for use by the device to cause the device to enter into the alert mode.

10. The method of claim 9, wherein discovering the device in the vicinity of the wireless device comprises transmitting a discovery signal.

11. The method of claim 9, further comprising:
    measuring, by a sensor of the wireless device, ambient noise; and
    causing, based on the ambient noise, the wireless device to generate a high volume audible alert for incoming communications to the wireless device.

12. The method of claim 9, further comprising:
    measuring, by a temperature sensor of the wireless device, ambient temperature; and
    causing, based on the ambient temperature, the wireless device to enter into the alert mode.

* * * * *